Patented Nov. 9, 1937

2,098,927

UNITED STATES PATENT OFFICE 2,098,927

3-AMINO-QUINALDINE DERIVATIVES AND A PROCESS OF PREPARING THEM

Ludwig Schörnig, Frankfort-on-the-Main, Germany, assignor to General Aniline Works, Inc., New York, N. Y., a corporation of Delaware No Drawing. Application August 10, 1935, Serial No. 35,670. In Germany August 16, 1934

9 Claims. (Cl. 260—38)

The present invention relates to 3-amino-quinaldine derivatives and a process of preparing them.

I have found that 3-hydroxy-quinaldines may be caused to react with primary or secondary amines of the aliphatic series or primary amines of the benzene series with formation of the correspondiing substituted 3-amino-quinaldines.

The reaction is advantageously carried out by heating the reaction components for several hours at a temperature between about 180° C. and about 300° C. in a closed pressure vessel. The products obtainable according to the present invention are new and correspond with the following general formula:

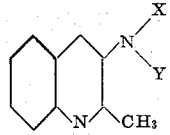

wherein X may be hydrogen or methyl and Y may be methyl or phenyl. They can be converted into dyestuffs of the quinophthalone class by fusion with phthalic anhydride, for example, in the manner described in U. S. Patents Nos. 890,588 and 2,006,022.

The following examples serve to illustrate the invention but they are not intended to limit it thereto, the parts being by weight:

(1.) 200 parts of 2-methyl-3-hydroxy-quinoline-4-carboxylic acid are heated in a pressure vessel for 30 hours at 200° C.–210° C. with 300 parts of an aqueous solution of methylamine containing about 40 per cent. of methylamine. In the course of the reaction the pressure rises to about 50 atmospheres. The dark-colored mass is extracted with benzene which dissolves the 2-methyl-3-methylamino-quinoline formed. This solution is dried with potassium hydroxide, cleared by filtration and evaporated. The 2-methyl-3-methyl-amino-quinoline remains in the form of a dark oil which distils nearly completely in a short range of temperature under a pressure of about 3 mm. at 157° C. The distillate is a thick yellowish oil which soon solidifies to a nearly colorless crystalline mass. It may be recrystallized from hexahydrobenzene or hot water and then has the form of colorless needles melting at 93° C.–94° C. The picrate is obtained, by adding picric acid to a hot aqueous solution of the base, in the form of a precipitate of fine small yellow crystals, which melt at 233° C.–234° C.

(2.) 200 parts of 2-methyl-3-hydroxy-quinoline-4-carboxylic acid are heated as described in Example 1 with 10 times their weight of an aqueous solution of dimethylamine which contains about 50 per cent. of dimethylamine. The mass is worked up as indicated in Example 1. The dark oil obtained after evaporation of the benzene solution is distilled in a vacuum. The greater part of the oil boils under a pressure of about 2–3 mm. at 160° C. The distillate is a yellowish, viscous oil which, on standing, solidifies to a nearly colorless crystalline mass. When dissolved in boiling water it separates, on cooling, in the form of colorless needle-shaped small crystals which melt at 90° C.–91° C. They are easily soluble in most of the organic solvents when heated and, on cooling, or evaporating, they may be obtained therefrom in the form of crystals. The picrate of the base which may easily be prepared as described in Example 1 forms fine small yellow crystals which melt at 230° C.–231° C.

(3.) 1000 parts of aniline are heated in a pressure vessel for 20 hours at 290° C.–300° C. together with 250 parts of 2-methyl-3-hydroxy-quinoline-4-carboxylic acid and 5 parts of iodine. Thereby the pressure rises to 28 atmospheres. The product forms a dark oil which is distilled fractionally under a pressure of 2–3 mm. whereby the excess of aniline first distils. The 2-methyl-3-phenylamino-quinoline is present in that part which boils under a pressure of 2–3 mm. between 180° C. and 220° C. and forms a thick yellowish oil. In order to obtain the base in a pure crystalline form the distillate is dissolved in dilute hydrochloric acid, the solution is clarified by boiling in presence of animal charcoal and cooled. The base is then precipitated in the form of its chromate by means of an excess of a saturated solution of potassium bichromate. The chromate is filtered with suction, washed with water and decomposed with caustic soda solution. The 2-methyl-3-phenylamino-quinoline is taken up in benzene and the benzene solution is dried with caustic potash. By slow evaporation or, if desired, by addition of hexahydrobenzene the base separates from the solution in feebly yellowish crystals melting at 120° C.–121° C.

The 2-methyl-3-phenylamino-quinoline easily dissolves in most of the organic solvents when heated and also in dilute hydrochloric acid. On cooling, the hydrochloride separates from the hydrochloric acid solution in the form of small yellow crystals melting at 235° C.–236° C.

In the preceding examples there may be used instead of 3-hydroxy-quinoline-2-methyl-4-carboxylic acid the equivalent amount of 2-methyl- 3-hydroxy-quinoline. $CO_2$ is not split off in these cases.

I claim:

1. The process which comprises heating for several hours a compound of the group consisting of 3-hydroxy-quinaldine and 3-hydroxy-quinaldine-4-carboxylic acid compound with an amino compound of the group consisting of primary and secondary amino compounds of the aliphatic series and primary amino compounds of the benzene series in a closed pressure vessel.

2. The process which comprises heating at a temperature between about 180° and about 300° C. for several hours a compound of the group consisting of 3-hydroxy-quinaldine and 3-hydroxy-quinaldine-4-carboxylic acid compound with an amino compound of the group consisting of primary and secondary amino compounds of the aliphatic series and primary amino compounds of the benzene series in a closed pressure vessel.

3. The process which comprises heating at a temperature of about 200° C. to about 210° C. for about 30 hours 2-methyl-3-hydroxy-quinoline-4-carboxylic acid with an aqueous methylamine solution in a closed pressure vessel.

4. The process which comprises heating at a temperature of about 200° C. to about 210° C. for about 30 hours 2-methyl-3-hydroxy-quinoline-4-carboxylic acid with an aqueous dimethylamine solution in a closed pressure vessel.

5. The process which comprises heating at a temperature of about 290° C.–300° C. for about 20 hours 2-methyl-3-hydroxy-quinoline-4-carboxylic acid with aniline in the presence of a small amount of iodine in a closed pressure vessel.

6. The compounds of the general formula:

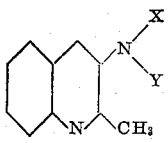

wherein X means a member of the group consisting of hydrogen and methyl and Y means a member of the group consisting of methyl and phenyl.

7. The compound of the formula:

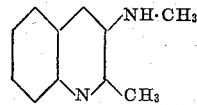

forming a nearly colorless crystalline mass which may be recrystallized from hexahydrobenzene or hot water and then has the form of colorless needles melting at 93° C.–94° C.

8. The compound of the formula:

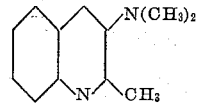

forming a nearly colorless crystalline mass which, when dissolved in boiling water, separates, on cooling, in the form of colorless needle-shaped small crystals which melt at 90° C.–91° C.

9. The compound of the formula:

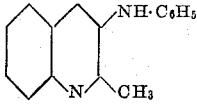

easily dissolving in most of the organic hot solvents and also in dilute hydrochloric acid wherefrom, on cooling, the hydrochloride separates in the form of small yellow crystals melting at 235° C.–236° C.

LUDWIG SCHÖRNIG.